(12) United States Patent
De Trana et al.

(10) Patent No.: US 6,275,578 B1
(45) Date of Patent: Aug. 14, 2001

(54) METHOD AND APPARATUS FOR PROVIDING BACK-UP, IN-BAND SIGNALING IN A COMMUNICATIONS NETWORK

(75) Inventors: Nicholas D. De Trana, Addison; Craig L. DeCaluwe, Naperville, both of IL (US); Hossein Eslambolchi, Basking Ridge, NJ (US); Patrick H. Fischer, Naperville; Joseph C. Kohler, Woodridge, both of IL (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/220,676

(22) Filed: Dec. 23, 1998

(51) Int. Cl.⁷ .............................. H04M 7/00; H04M 9/06; H04J 1/16; H04J 3/14
(52) U.S. Cl. .......................... 379/229; 370/225; 370/228; 379/230; 379/235; 379/236; 379/237; 379/240; 379/221.04
(58) Field of Search ...................................... 379/219, 220, 379/221, 229, 230, 235, 236, 237, 240, 279, 220.01, 221.03, 221.04; 370/216, 217, 218, 225, 227, 228

(56) References Cited

U.S. PATENT DOCUMENTS 5,333,187  *  7/1994  Hiraiwa et al. .................. 379/230 X
5,831,969  *  11/1998  Bales et al. .......................... 370/225

* cited by examiner

Primary Examiner—Ahmad Matar

(57) ABSTRACT

A method of detecting and recovering from an out-of-band signaling failure in a telecommunications network involves the reprogramming of switching centers to utilize existent inband signaling capabilities to temporarily replace the failed out-of-band capability. A processor of an originating switching center recognizes the loss of out-of-band signaling capability, determines impacted trunks and switches to in-band signaling from out-of-band signaling. In an alternative embodiment, the switch may use maintenance data bits of impacted trunks to initiate a call. The terminating switching center is programmed to receive and recognize the change in bit value of the signaling data and initiates well known processes to seize the trunk in memory, check continuity and receive dialed number data, preferably in the form of tones, over the seized trunk. The terminal switching center for the trunk then attempts to complete the call in accordance with the received dialed number data. Preferably, the in-band signaling system reverted to comprises multi-frequency (MF) address and E and M wink start supervisory signaling. At the conclusion of the out-of-band outage, the signaling characteristic is restored to out-of-band from in-band.

17 Claims, 4 Drawing Sheets

METHOD AND APPARATUS FOR PROVIDING BACK-UP, IN-BAND SIGNALING IN A COMMUNICATIONS NETWORK

BACKGROUND OF THE INVENTION

1. Technical Field

This invention relates to the field of signaling systems for a telecommunications network and, more particularly, to a method and apparatus for reverting to in-band signaling in the event of the detection of a failure of presently conventional out-of-band signaling systems.

2. Description of the Relevant Art

In the United States, it became prevalent in the telecommunications arts to provide in-band signaling between switching centers through the middle of the twentieth century. Referring to FIG. 1, there is shown a simplified block diagram of the telecommunications network in the United States circa 1970. FIG. 1 is used by way of example to describe in-band signaling; it is not intended to comprise a thorough study of telecommunications networks, and the reader is referred to well-known telecommunications textbooks for further insight. While Local Exchange Carrier (LEC) was a term not known in the art in the middle of this century, LEC 180 signifies one of the several Bell telephone operating companies or independent telephone companies serving a local geographic area. Of course, in the middle of this century, there was only one toll carrier, American Telephone and Telegraph Company (AT&T), signified as toll carrier 190. At a time after the middle of this century, competition in toll services was permitted and other toll carriers entered the market. Other toll carriers would be shown as separate network clouds 190. Of course, there exists several LEC's 180, and each LEC connects to the several toll carriers, the LEC's providing service in their respective geographic areas.

A local subscriber 100 in a local exchange area is connected, according to the system of FIG. 1, by typically a two wire facility 110 to an end office 130. A second end office 135 is shown within the local area 180 connected to end office 130 by trunk/trunk group 140 for completion of local calls. The two wire facility 110 connecting a subscriber to an end office 130 is typically a copper wire pair and the end office 130, 135, typically, a No. 5 cross-bar switch manufactured by, then, Western Electric Company, and still supported today by Lucent Technologies, Inc. Generally, these crossbar type common-controlled switches of end offices 130, 135 and even older vintage switches such as step-by-step switches have been replaced for the most part by electronic switching systems. Typically, two or four wire trunk facilities 140 connect end office 130 of LEC 180 with other end offices, such as end office 135, in the local exchange carrier's network 180. These may be N carrier, T carrier, copper wire or other facilities then prevalent. A two wire or four wire facility 150 (a four wire facility is shown) is typically used to connect an end office 130 to an originating toll switch (OTS) 170. An originating toll switch 170, in turn, is typically connected to other toll switches of a toll network 190 by four wire facilities. By four wire facility is intended the use of tip and ring leads for each direction of transmission or simulated four wire facilities such as carrier facilities. Trunks 150 may be one way (such as originating or terminating trunks or trunk groups) or two-way (both originating and terminating at end office 130; two-way trunks may be seized and busied out by either end office 130 or originating toll switch (OTS) 170). Long distance trunks 155 are shown leaving originating toll switch 170 for connection to other toll switches (not shown) in toll network cloud 190. In the 1970's, analog L carrier facilities were typically utilized for long distance trunks 155, either via land line or microwave. Since then, these have been substantially replaced by digital trunk facilities (T1, T3, . . . hierarchy) in time division multiplex arrangement.

A customer 100 in the United States typically dials a toll/directory number (DN) given by a three digit area code and a seven digit address of a called party within the dialed area code to reach a called party outside the calling party's area code. (In some states such as Maryland, one must dial the area code and telephone number to make a local call.) The signaling data is provided to end office 130 via dial pulse or tone signals originating from a rotary dial switch or a tone signaling pad of a telecommunications terminal respectively of calling party 100. These are carried via two wire facility 110 to end office 130. In a toll call or a local call involving more than one office, the end office 130, 135 may repeat the so-called dial pulse (DP) address signals or generate different tone address signals as appropriate. In the latter case, for example, there is a translation of "touch-tone" to dual tone multifrequency (MF) signals at end office 130, 135 for transmission on trunk 150, 140.

Thus, for each trunk between switching centers, such as end office 130 and originating toll switch 170, there is a respective supervisory signaling and a DP or MF address signaling capability directly associated therewith. This direct association of a signaling path for supervisory and address message signaling with a voice/data trunk 150 is what is intended herein by in-band signaling. In-band signaling was prevalent and out-of-band signaling unknown in the telecommunication arts until the 1970's.

Referring to FIG. 2, and by way of example, there is shown a typical in-band signaling arrangement for T1 carrier. T carrier, developed in the late 1960's, has replaced analog carrier systems such as N and L carrier over time. T1 carrier utilizes a digital pulse code modulation scheme and permits the transmission of 24 voice/data channels over a 1.544 megabit per second data stream. A T1 carrier system comprises 24 individual voice/data channels. In a simple example, each channel may comprise one trunk connecting two end points.

Associated with each channel, according to prior art T1 systems, there would be, for example, the digital equivalent of an E and M (Ear and Mouth) lead or other supervisory signaling and an MF address signaling capability. Supervisory signaling comes in several varieties such as ground start and wink start depending, for example, on how and which office initiates the signaling. Each channel provides a digital bitstream for a voice or data channel and an in-band signaling data and a maintenance data path as will be further explained below.

Signaling for supervisory and address messages requires little bandwidth while voice/data consumes much greater bandwidth of a channel. Consequently, to utilize an entire voice/data channel for supervisory and address signaling came to be recognized as a waste of the voice/data bandwidth of the channel. There was recognized a need in the telecommunications art to preserve the bandwidth requirements. Also, the end-to-end links from a calling party 100 to a called party might involve tying up trunks connecting as many as nine switching centers of LEC 180, toll carrier 190 and a terminating LEC (not shown) according to the prior art. For example, a voice/data bandwidth signaling path would be required from End Office 130 of FIG. 1 all the way through a hierarchy of switching centers in a local/toll network configuration to reach a terminating end office (not shown). The waste of bandwidth per channel, thus, was further compounded by the unnecessary reservation of trunks and service circuits all across the country when it might be learned from the terminating end office that the called party would be "busy" or a switching center in the path would be otherwise unable to provide a link through the office, a service circuit or a trunk to the next office. Finally, the problem with in band signaling was further complicated by a problem with black box long distance line fraud. The black box could be used by a service pirate to steal telephone service by emulating the tones of MF signaling. Once a long distance line was seized via a toll-free call, a terminating toll office could be fooled to connect a caller to another number. With a switch to out-of-band digital packet signaling, the black box toll fraud was eliminated.

Also, while the in-band supervisory and address signaling capability remained with the T1 carrier channel, it was no longer utilized for its original purpose with the switch to out-of-band signaling. The T1 carrier channel unit, for example, typically may have unutilized MF wink start, address/supervisory signaling capability and bandwidth.

Out-of band signaling evolved, then, from the recognition of this waste of bandwidth, trunk resources and the desire to eliminate black box fraud. The first out-of-band signaling was known as Common Channel Interoffice Signaling (CCIS). CCIS provided, initially, a way of moving supervisory and address signaling, for example, from each T1 carrier channel to a single channel where the signaling information for a plurality of voice/data channels could be multiplexed together, saving having to tie up the plurality of voice/data capacity for signaling.

It also became recognized that such signaling could be provided end-to-end, from the calling party to the called party. It became an objective to build signal transfer points connected, for example, in a data network whereby a caller and a called party's identity could be shared between end points of a communication path. Once an originating end office, such as end office 130, signaled a terminating end office where a called party was located, then and not until then, the two offices are connected by a voice/data channel arranged through intermediary offices. The signaling functions is segregated from the voice/data transmission function of the network and is performed sequentially. The voice/data connection need not be established if the called party is busy.

The first out-of-band signaling protocol was known as CCS6. CCS6 has been replaced for the most part by CCS7 or common channel signaling system 7. An address signaling message packet is generated at an originating office. The packet carries, among other information, the address (data representing the phone number including area code) of the calling party 100 and the address (phone number) of the called party so that, once it is determined that the called party is not busy, a voice/data facility may be connected between the parties. From the toll network's perspective, the most important information of the called party address is the area code and first three digits of the seven digit telephone number signifying the terminating end office location. (Of course, this is a simplified explanation of simple voice services—alternative advanced services such as cellular, paging, call forwarding and voice messaging services are more complicated to provide.) With this information, a signaling data packet entering a signaling network can signal any signal transfer point reading the packet whether the token is destined for that signal transfer point.

Referring briefly to FIG. 3, each processor or auxiliary processor such as 3B processor 325 has links to a pair of signaling transfer points (STPs). These are shown as links connecting link nodes (LN's) on the ring 350. Simply stated, each signaling message contains a destination point code (address) where the message is destined for and an originating point code identifying where the message was sent from. STP's are duplexed (paired) to provide redundancy back-up, and, as will be further explained below, any failure of a single STP or connection will not cause a loss of service.

A problem has arisen in recent years when two signal transfer points of an out-of-band signaling system 350, such as SS7, may in rare instances break down. Such a calamity has occurred and may occur again. The entire country or a whole region of the country may not be able to originate or receive toll communications services due to such a breakdown. Other potential failures are a breakdown in an Application Peripheral Interface (API) or an auxiliary 3B processor at a #4ESS toll switch along with an Input/Output interface frame or F-link breakdown to a helper toll switch as will be further described herein.

One solution to the problem of an out-of-band signaling breakdown has been to provide redundancy in the signaling network. For example, each originating toll switch 300 may be connected to, not just one, but two signal transfer points. The two STP's form an STP pair. The second signal transfer point also provides access to the signaling network 350. Even with this redundancy, the possibility of a failure exists.

Referring briefly to FIG. 3, the redundancy solution, for example, may include providing access to a helper toll switch via an I/O frame and F links to gain access to another toll switch called a helper switch so the signaling packet may be sent to another signal transfer point (STP). Nevertheless, there may still be a severe signaling network breakdown. The loss of signal may not be due to the loss of an STP but a break in the ring, a loss of an auxiliary processor or other breakdown. Consequently, there is a need in the art for a method and apparatus for providing recovery from such a loss of out-of-band signaling capability.

SUMMARY OF THE INVENTION

According to the principles of the present invention, a method and apparatus for detecting and recovering from a failure of an out-of band communication signaling system is provided which utilizes inherent, existing in-band signaling resources to back up an out-of-band system. Upon detection of an out-of-band signaling failure, there is accomplished a reversion to the existing in-band signaling resources for a period of time until the out-of-band signaling system failure can be repaired. A method of detecting and recovering from such a failure comprises the steps of detecting the failure of an out-of-band signaling system at an originating switch, determining the extent of the failure, and utilizing existing in-band signaling capabilities, associated with outgoing and two way trunk groups, for transmitting supervisory and address signaling information responsive to detection of the failure. In one embodiment, each end of the toll call, that is, the originating and the terminating toll switch, will detect the loss of out-of-band signaling ability at the originating toll switch. In another embodiment, the A and B alarm bits may be used for signaling the alarm status of the out-of-band signaling system and reversion to, for example, wink start and MF supervisory/address in band signaling. The apparatus for implementing the detection and recovery method may be located preferably at, for example, or in conjunction with a 1B control processor of a #4ESS switching system manufactured by Lucent Technologies, Inc. or a similar central processor of other known toll switches manufactured by others such as Siemens AG and Northern Telcom. Thus, the method may be most conveniently implemented in software at any originating toll switch. In the alternative embodiment, unutilized A and B alarm bits of the T carrier channel signal the alarm status of each switch end of the trunk and unutilized in band E and M supervisory signaling capability (for example, wink start). Then, in band MF address signaling data can be again utilized for signaling through the network to achieve end-to-end address signaling preceding voice/data connections.

In a preferred embodiment, whenever a switch, an end office switch, an access tandem (yet to be discussed), an originating toll switch or a terminating toll switch, identifies a point code (switch address) as unaccessible, that switch will identify all impacted trunks, trunk sub-groups and/or trunk groups. Once these are identified, these will be regarded for the in-band signaling capabilities and the switch programmed to change the signaling characteristics of any trunks permitting the switchover to, for example, multifrequency (address) and wink start (supervisory) signaling. The terminating office may be already programmed to recognize the loss of SS7 signaling in this embodiment, the office then may be programmed to check for trunk path continuity on identified, impacted trunks having in-band capability and use in-band signaling to communicate and establish calls to the isolated switch The terminating office will then receive (and send) calls via in-band signaling for the duration of the out-of-band failure.

These and other features of the present invention will be best understood from reading the following detailed description and studying the accompanying drawings.

BRIEF DESCRIPTION OF THE INVENTION

Figure 3:
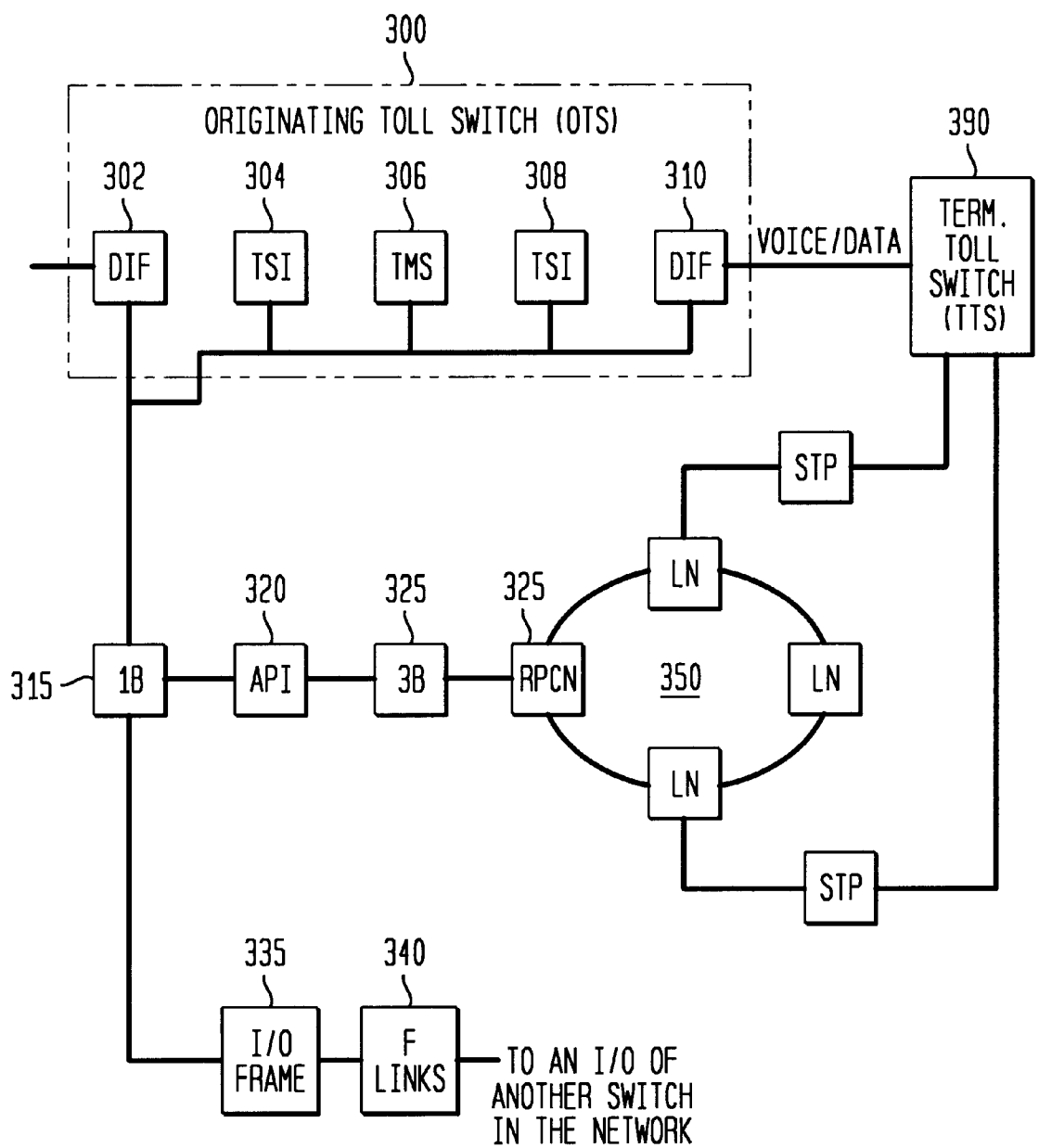

FIG. 3 is a simplified system block diagram of a contemporary telecommunications network useful for explaining the principles of the present invention implemented, for example, in conjunction with a control processor of an originating or terminating toll switch, for example, an originating toll switch where a failure of an out-of-band signaling system may be detected and an action taken to revert to in-band signaling.

Figure 4:
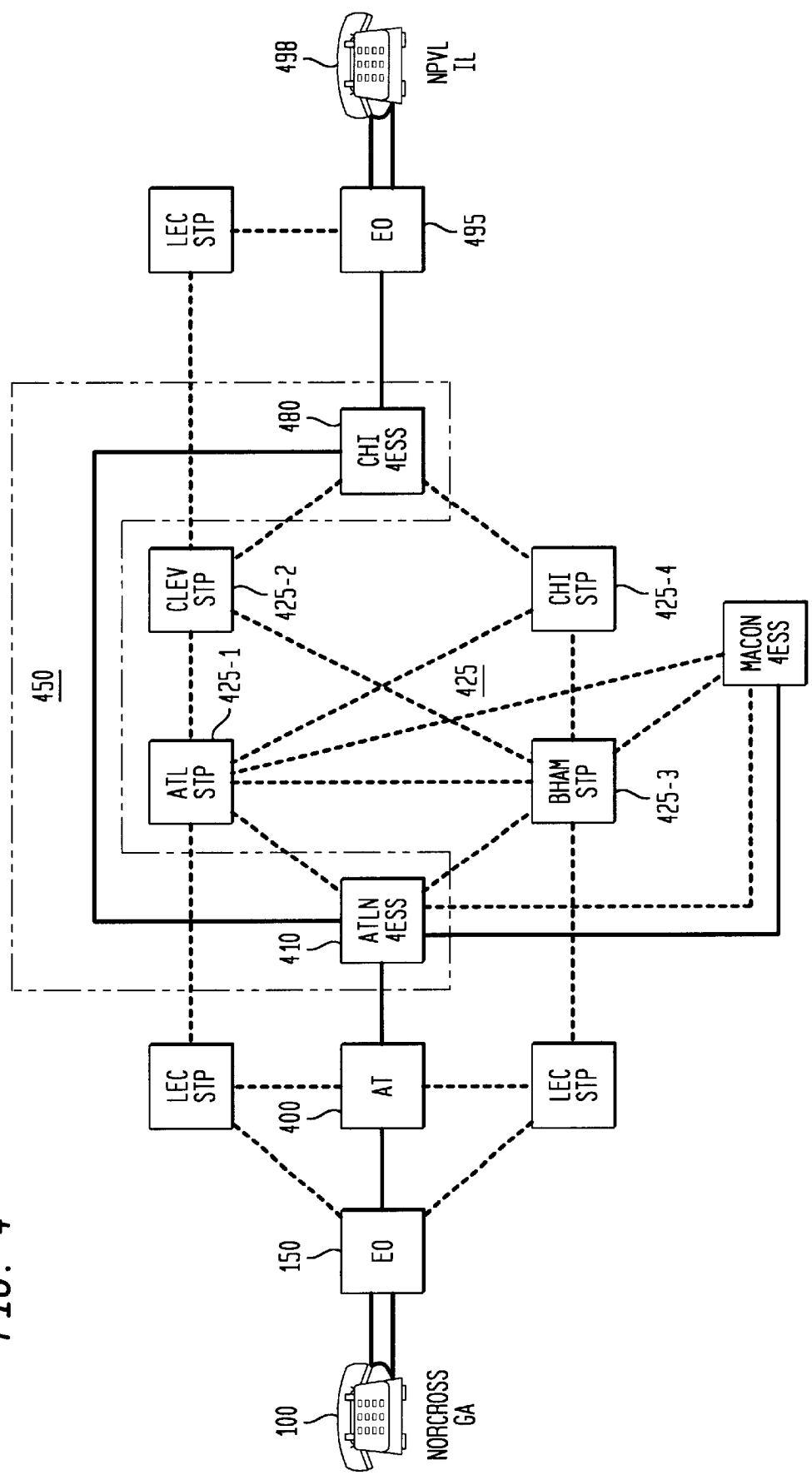

FIG. 4 is a simplified system block diagram for describing a typical toll call from a calling party 100 to a called party 498 utilizing out-of-band signaling network 425 to arrange for an exchange of signaling data prior to connecting via voice/data network 450.

Figure 5:
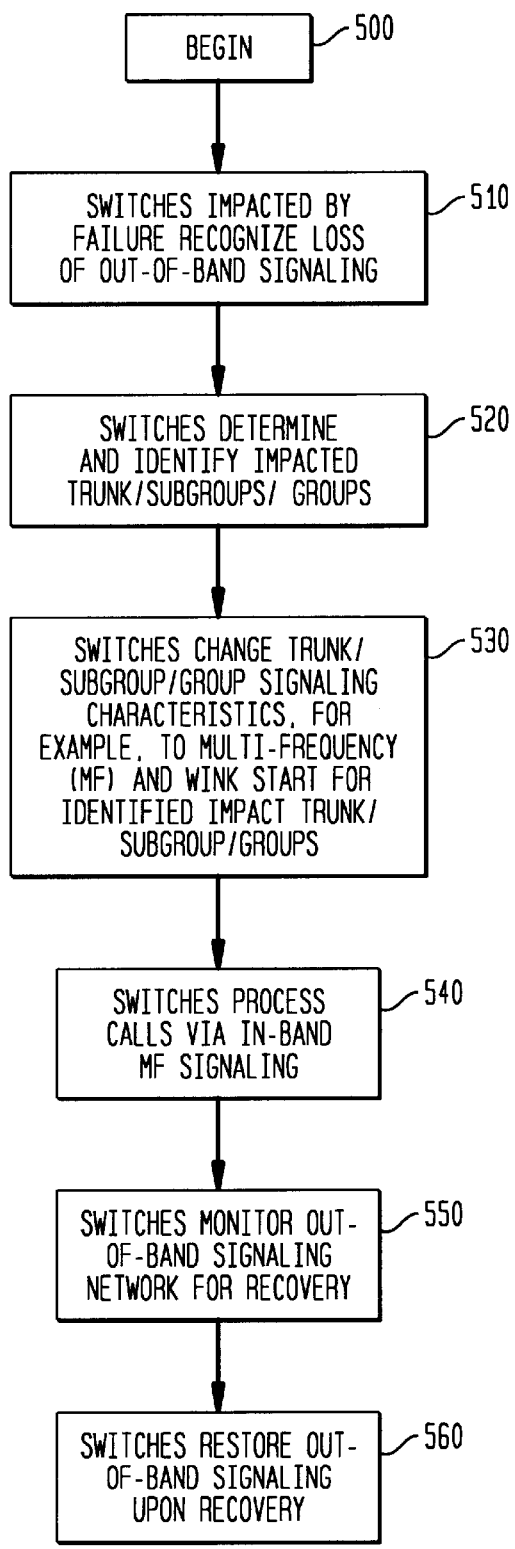

FIG. 5 comprises a simplified flowchart for explaining an algorithm for implementation in association with a processor of an end office, toll switch or signal transfer point, the algorithm comprising a software modification to existing in band and out-of-band signaling systems.

DETAILED DESCRIPTION

Referring to FIG. 4, there is shown a simplified block diagram for describing a call from a calling party 100 in Norcross, Ga. to a called party 498 in Naperville, Ill. The diagram will be utilized to describe how an out-of-band signaling system comprising a quad (four) of signal transfer points (STP's) 425 can quickly and efficiently let originating and terminating toll offices exchange all the signaling information needed to be exchanged to establish a call. There are local exchange carrier (LEC) STPs shown along with interexchange carrier STP links and three toll switches including originating toll switch 410 and terminating toll switch 480. Then, a voice connection may be established between the caller 100 and the called party 498 via a separate voice/data network 450. In the drawing, dashed lines represent A, B or C links where B links connect STP's between regions and C links connect mate STPs together such as Atlanta and Birmingham. A dotted line path is shown connecting the Atlanta and Macon toll offices to show the helper switch path described in FIG. 3. Solid lines represent voice/data links. Lucent 4ESS switches are shown by way of example only and the invention should not be considered limited by the use of such a specific toll switch when other toll switches manufactured by others could be equally utilized.

Voice/data network 450 is shown in greatly simplified form. Voice/data toll network 450 in fact comprises a plurality of switches including originating toll switch 410 and terminating toll switch 418 connected by trunks and is only shown by two representative switches. The Macon, Ga., #4ESS is shown connected to two STP's, the Birmingham STP 425-3 and the Atlanta STP 425-1 via A links and to the Atlanta switch 410 as a helper switch. As already described, these two STP's of an STP pair provide redundancy and hence protection of the network from a single fault causing a failure. The voice/data network 450 over which a call may presumably be connected further involves the Atlanta 4ESS office 410 and Chicago 4ESS office 480, the two end offices and the access tandems (only one, access tandem AT 400 being shown for simplicity) over which the voice/data call will be connected after end points Atlanta and Chicago are signaled via quad 425.

Signaling system 425 is segregated to an extent from voice/data network 450 and operates first to convey signaling information between end points. Calling party 100, end office 150 and access tandem 400 (for accessing the toll network of the calling party's choice) comprise an originating end point along with originating toll switch (OTS) 410 at Atlanta, typically, in the AT&T network, a #4 ESS switch manufactured by Lucent Technologies, Inc. A terminating end point comprises called party 498, end office 495, and Chicago terminating toll switch (TTS) 480. The originating and terminating end points are identified by signaling information known in the art as point codes for the origin and terminus switches respectively. Associated with the Atlanta originating toll switch 410 is an Atlanta signaling transfer point (STP) 425-1 whereby the toll switch accesses the STP network 425 via the CNI ring 350 shown in more detail in FIG. 3. Only Atlanta, Cleveland, Chicago and Birmingham STP's of quad network 425 are shown for simplicity of the example. The purpose of the STP quad network 425 and SS7 protocol again is to pass along signaling data as quickly and efficiently as possible. Signaling data is sent from the originating switch to a destination switch using point codes. These are addresses used to send and receive signaling messages via the STP's. At the end point, the status of the called party 498 is determined and information returned to let both end points, in this example, Atlanta and Chicago, know the respective addresses of the calling and called parties and the status of the called party. Once it is determined that the called party 498 is represented by a terminal that is available to receive a call (their line is not busy), a separate voice path is established via voice/data network 450 (used to set up the call, not used for the voice/data path).

In a preferred embodiment, the Atlanta toll switch is in fact connected to two signal transfer points of signaling network 425 (Birmingham and Atlanta shown) in the event the first STP does not respond or has failed. Even with this redundancy, that is provided by forming STP pairs, both STP entries of a given STP pair may fail. In such a case, which has in fact occurred and may occur again, whole geographic regions of the country may be without long distance capability. Hence, the problem solved by the present invention can and has arisen.

The voice path may comprise a path via other toll switches, but it need not be so. When a direct voice/data path between end points is not available, a via list is utilized at originating and terminating toll switches to identify alternative paths between the two switches. The via list is updated in real time with data signifying the identity of connections (end-to-end or connecting trunks or trunk groups) to each switch. A via list is a real time routing list indicating what idle voice/data trunk facilities exist in real time, in priority order by least used facility, connected to each end point. Again, the solid line voice path 450 obtained from the via lists will be completely segregated from the quad STP signaling network 425.

Further details of the out-of-band signaling network are shown in FIG. 3. The "switching" portion of a time division multiplex switch, in this instance a #4ESS switch, for switching packets of voice samples/data is shown as originating toll switch 300. There are two DIF frames, frames 302 and 310 two TSI (Time Slot Interchange) frames, frames 304 and 308 and a TMS frame 306. These are controlled by a 1B processor 315. An SS7 signaling portion of the switch comprises an application peripheral interface (API) 320, an auxiliary 3B processor 325 and a CNI ring 350. The 3B processor 325 interfaces with the CNI ring 350 which connects to an STP pair via link nodes (LN). Also, redundancy may be provided by permitting the 1B processor 315 to send signaling data that will form signaling messages in an alternative direction if the path through the API 320 and 3B processor 325 to CNI ring 350 is not available or has failed. The 1B processor 315 recognizes the problem and forwards the signaling data via an I/O frame 335 on an F link 340 to a helper switch (not shown) which may gain access through another, redundant STP pair via its own CNI ring 350. Presently, when a failure of the out-of-band signaling system occurs, there can exist a catastrophic condition where the geographic area represented by the toll switch 300 is not available to provide any connections because it cannot signal out. In such an instance, no calls can be made through that switch.

According to the present invention, for example, the 1B processor 315 is programmed to recognize a failure of the out-of-band signaling system, both CNI and I/O access failures. In an alternative embodiment, a toll switch manufactured by a manufacturer other than Lucent may be employed, and there would still exist a central call processor having the same failure detection capability. Thus, the present invention may be utilized in equipment of other toll switch manufacturers such as Northern Telcom. The sequence may involve first an attempt to pass signaling data to the CNI ring 350 via API 320 and 3B 325. Then an attempt may follow to try the path via I/O frame 335 and F links 340 to a helper switch. Failing these attempts, the 1B processor 315 may look-up in a look-up table the existence of trunks/trunk groups to the terminating toll switch 390. Typically, these trunks will be indicated as having in band supervisory and address signaling capability. In one embodiment of the invention, finding such a path, for example, via a T carrier facility, the A&B bits are used in any way a programmer chooses to activate, for example, wink start supervisory signaling, a continuity check by the terminating office and MF signaling to the terminating office 390 so the terminating office 390 can recognize the failure if it cannot do so automatically. In another embodiment, the terminating switch 390 may be programmed to recognize the failure of the out-of-band signaling network (and in particular, the failure of signaling between it and a specific toll office such as originating toll switch 300). In either embodiment, an originating or two way trunk group may be seized and used to signal the destination and complete the call.

In other words, and by way of example, both the originating an terminating switches, which may be either local or toll switches, will detect the out-of-band signaling failure and change their signaling characteristics of associated trunks, trunk sub-groups and trunk groups impacted by the 220 failure from SS7 to MF wink start. The operation will now be further described in view of the flowchart of FIG. 5.

These steps of a reversion method at an originating and terminating toll switch to in band signaling are now more particularly described in the flowchart of FIG. 5. The process begins at box 500. At step 510, if the originating and terminating toll switch processors recognize a loss of out-of-band signaling, the present algorithm is initiated to revert to in-band signaling. The loss of out-of-band signaling may require 1) the recognition of a failure or unavailability of a primary signal transfer point and 2) the recognition of a failure or unavailability of a secondary or redundant signal transfer point. In particular, the recognition of the failure or unavailability of a primary signal transfer point may involve the recognition of a failure in an application peripheral interface 320, an auxiliary processor such as 3B 325, a failure in the passing of signaling information in one direction or the other around the CNI ring 350 or a failure of the destination STP or switch CNI ring. Also, the recognition of a failure or unavailability of a redundant STP may involve the recognition of the failure of an I/O interface 335, an F-link 340, a helper switch or any failure of the redundant STPs of the STP pair or the terminating office.

According to the prior art, if the main processor, for example, a 1B processor 315 of a #4ESS switch, could not utilize out-of-band signaling, a major calamity might ensue. The present invention requires a reprogramming of the processors of the originating and terminating switches and suggests the use of E&M bits to signal supervisory status in place of the out-of-band network. At step 520, the reversion process begins by each toll switch processor referring to its memory to determine impacted trunks, trunk subgroups or trunk groups connected to an impacted terminating switch. The trunk, subgroup or group of trunks is presumed or checked via facility management systems known in the art to comprise in band supervisory and MF address signaling capability as well as maintenance or alarm capability (still used today to help identify a failure condition of the T1) that has been left unused since out-of-band signaling was initiated. The trunk, sub-group so determined may be identified in memory as impacted but having the capability for call completion via in-band signaling. If there is a call for completion, the call may be completed via such an identified trunk.

At step 530, each switch changes its trunk/subgroup/group signaling characteristics for all compacted trunks/subgroups/groups, for example, to an appropriate mode of address and supervisory signaling, such as, for example, MF wink start. If there is a toll call for completion, the OTS seizes a toll trunk and signals a terminating toll switch at the other end of the trunk with the information needed to complete the call.

At step 540, each impacted switch processes calls via, for example, in-band MF signaling. Dial pulse signaling may be used as well for address signaling but the speed of call completion will be slowed considerably to 1950's vintage service. Other forms of supervisory E&M lead signaling may be used to advantage as well besides wink start, e.g., delay start dial. The terminating toll switch now records the seizure of the incoming trunk from the originating toll switch and prepares to receive and record the forwarded address data for the called party from the originating switch. The TTS also may first initiate a check of the continuity of the trunk or trunk group (in a preferred embodiment the wink start accomplishes this) to the OTS and then receive MF (or other) address signaling data including as necessary the destination area code and telephone number. The OTS then may send the MF or other form of address signaling data as would have been known in the prior art in 1970. With the MF or other address signaling data, the TTS is now in a position to attempt to complete the call to the called party as it would have circa 1970. (Other in band address signaling systems than MF such as dial pulse may be used in some embodiments depending on the application or, if the out-of-band signaling has been restored, complete the call using that means.)

At step 550, each switch impacted by the out-of-band failure monitors the out-of-band signaling network for recovery of signaling by that method. The reversion to in-band signaling, hopefully, will be temporary because in-band signaling, even MF signaling, is less efficient than out-of-band signaling and advanced services are not available (e.g., SDN, transfer connect . . . ). At step 560, the switches impacted by the out-of-band failure restore their signaling characteristics from in-band signaling back to out-of-band signaling.

Figure 1:
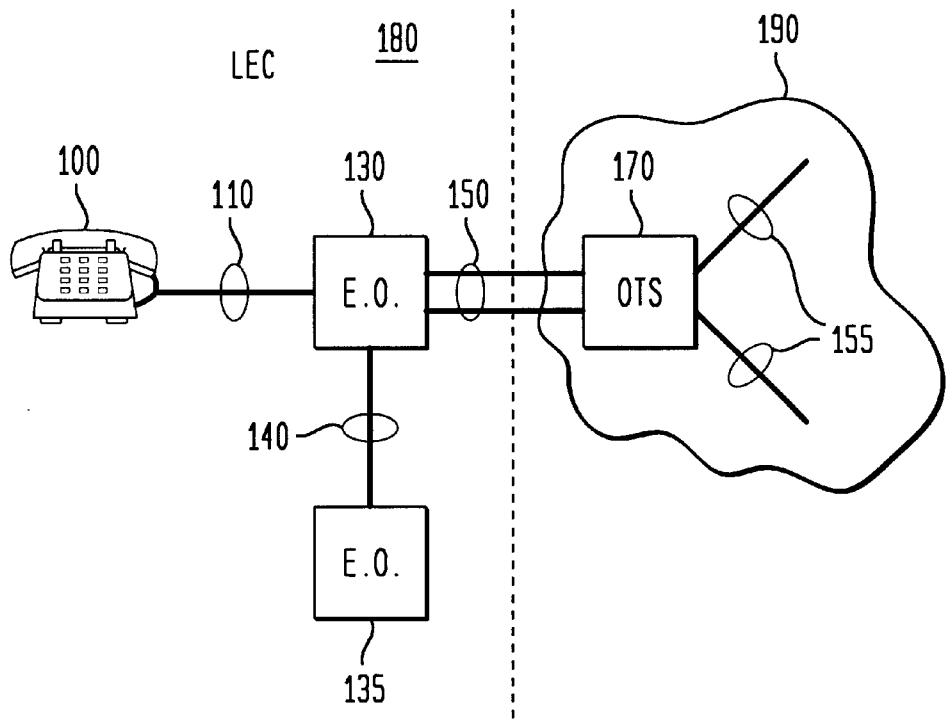
FIG. 1 is a simplified system block diagram of a prior art telecommunications network useful for explaining prior art in-band signaling comprising supervisory and address signaling.
Figure 2:
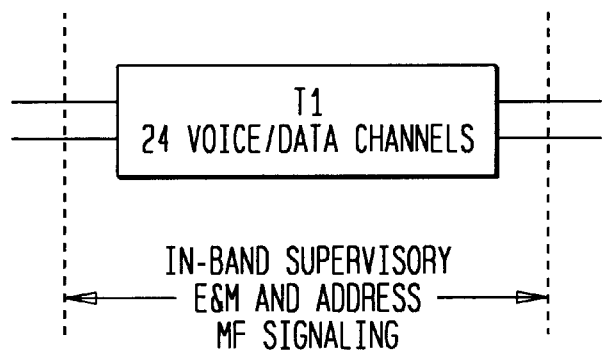
FIG. 2 is a simplified block diagram showing a prior art T1 carrier system comprising twenty-four channels, each having in-band supervisory and address signaling and maintenance data transmission capability along with voice/data.

In another preferred embodiment, the in band MF signaling may be used not only to signal the destination address (dialed number or DN) but the originating number (providing automatic number identification) of the calling party. Thus, the TTS may have the capability to generate signaling messages for output to a CNI ring 350 to the LEC or as if the TTS were a redundant helper switch. These and other features of the present invention may be modified by one of ordinary skill in the art to permit the principles to be applied to other processor-controlled switches besides the exemplary #4ESS toll switch described herein. Other representative manufacturers include Siemens AG and Northern Telcom. While the present invention has been described in the context of a toll network, local exchange carriers may employ the present invention as well for local or long distance calling, for example, for back-up signaling between end offices 130 and 135 (FIG. 1) or between EO 130 and OTS 170 (FIG. 1) or other combination of local and/or toll offices. The present invention should only be deemed to be limited by the claims which follow.

What we claim is:

1. A method of detecting and recovering from an out-of-band signaling failure in a telecommunications network, the method comprising steps of:

receiving dialed number data at a processor of a common-channel-controlled switching system;

detecting an out-of-band signaling failure at the processor of the common-channel-controlled switching system;

determining from memory an available trunk toward a destination switching system identified based on the received dialed number data, the available trunk having an in-band signaling capability;

seizing the available trunk; and transmitting, via the seized available trunk, signaling supervisory and address data for a call based on said dialed number data.

2. A method as recited in claim 1, wherein said dialed number data is received at an originating toll switch from a local exchange carrier.

3. A method as recited in claim 1, further comprising a step of translating said dialed number data to dual tone multi-frequency signals.

4. A method as recited in claim 1, wherein the step of detecting the out-of-band signaling failure comprises a further step of identifying at least one of a trunk, a sub-group of trunks and a group of trunks that are impacted by the out-of-band signaling failure.

5. A method as recited in claim 4, wherein an extent of the out-of-band signaling failure is determined based on an attempt to send out-of-band signals by a first out-of-band signal path and a redundant out-of-band signal path.

6. A method as recited in claim 1, wherein said seized available trunk comprises a digital data trunk having associated in-band wink start supervisory and in-band multi-frequency tone address signaling capability.

7. A method as recited in claim 1, further comprising a preliminary step of programming said common-channel-controlled switching system to change a signaling characteristic for a trunk from an out-of-band signaling characteristic to an in-band signaling characteristic upon detection of an out-of-band signaling failure event.

8. A method as recited in claim 1, further comprising steps of recognizing wink start at a terminating office, signaling a continuity check signal to an originating switching center over the seized trunk and receiving multi-frequency address data over the seized trunk.

9. A method as recited in claim 2, further comprising a step of attempting to complete a call associated with the dialed number data to the destination switching system.

10. A method for detecting at a terminating switching center an out-of-band signal failure between an originating switching center and the terminating switching center, the method comprising steps of:

receiving and recognizing a loss of out-of-band signaling at the terminating switching center;

identifying at least one trunk impacted by the loss of out-of-band signaling and changing a signaling characteristic of at least one trunk identified as impacted by the loss of out-of-band signaling from an out-of-band signaling characteristic to an in-band signaling characteristic;

receiving in-band address signaling data over a trunk that is connected to the originating switch center and has been changed from the out-of-band signal characteristic to the in-band signaling characteristic; and attempting to complete a call to a dialed number, said dialed number being indicated by said in-band address signal data.

11. Apparatus for detecting and recovering from an out-of-band signaling failure in a telecommunications network, comprising:

a data processor of a common-channel-controlled switching system receiving and sending dialed number data and detecting an out-of-band signaling failure; and a memory storing an availability of at least one trunk having an in-band signaling capability toward a destination switching system that is identified based on received dialed number data, the data processor further modifying a status of a selected trunk from an out-of-band signal characteristic to an in-band signaling characteristic, the status modification providing in-band supervisory and address signaling capability for the selected trunk.

12. Apparatus as recited in claim 11, further comprising at least one digital in-band signaling trunk capable of outputting in-band signaling data and connecting the common-channel-controlled switching system with the destination switching center.

13. Apparatus as recited in claim 12, wherein said digital in-band signaling trunk utilizes pulse code modulation and in-band supervisory data for the digital in-band signaling trunk comprises E and M signaling data.

14. A method of detecting and recovering from an out-of-band signaling failure in a telecommunications network, the method comprising steps of:

detecting an out-of-band signaling network failure at the processor of a common-channel-controlled switching system;

identifying at least one trunk impacted by the out-of-band signaling failure; and changing a signaling characteristic of at least one selected trunk from an out-of-band signaling characteristic to an in-band signaling characteristic having supervisory and address data.

15. A method of detecting and recovering from an out-of-band signaling failure as in claim 14, further comprising steps of:

monitoring for restoration of the out-of-band signaling network; and changing the signaling characteristic of each selected trunk from the in-band signaling characteristic to the out-of-band signaling characteristic upon detecting restoration of the out-of-band signaling network.

16. Apparatus for detecting and recovering from an out-of-band signaling failure in a telecommunications network, comprising:

a data processor of a common-channel-controlled switching system receiving and sending signaling data, the data processor detecting an out-of-band signaling failure, and, upon detecting an out-of-band signaling failure, the data processor changing a signaling characteristic for at least one impacted trunk to an in-band supervisory and address signaling.

17. Apparatus of claim 16, further comprising a memory associated with said data processor, the memory recording a previous state of out-of-band signaling, the change in signaling characteristics to in-band signaling, and an identity of each impacted trunk.

* * * * *